United States Patent
Zhou et al.

(10) Patent No.: US 10,110,693 B2
(45) Date of Patent: Oct. 23, 2018

(54) SYSTEM AND METHOD FOR CONTENT AND APPLICATION ACCELERATION IN A WIRELESS COMMUNICATIONS SYSTEM

(75) Inventors: Wenzhe Zhou, Cupertino, CA (US); Jim Zhao, Los Altos, CA (US); Jian Li, Fremont, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 1572 days.

(21) Appl. No.: 13/400,527

(22) Filed: Feb. 20, 2012

(65) Prior Publication Data
US 2013/0219008 A1 Aug. 22, 2013

(51) Int. Cl.
  G06F 15/167 (2006.01)
  H04L 29/08 (2006.01)
  H04L 29/06 (2006.01)
  H04L 12/801 (2013.01)

(52) U.S. Cl.
  CPC .......... *H04L 67/2842* (2013.01); *H04L 47/12* (2013.01); *H04L 69/04* (2013.01)

(58) Field of Classification Search
  CPC ................................ G06F 12/08; G06F 15/16
  USPC .......................................... 709/216; 711/113
  See application file for complete search history.

(56) References Cited

U.S. PATENT DOCUMENTS 5,907,678 A    5/1999  Housel, III et al.
8,224,794 B2 *  7/2012  Rappaport .................... 707/694
2006/0195615 A1 * 8/2006  Gollapudi et al. ............ 709/247
2007/0234324 A1  10/2007  Ananthakrishnan et al.
2009/0042608 A1  2/2009  Moon et al.
2009/0161554 A1  6/2009  Agarwal et al.
2009/0318075 A1  12/2009  Kwon et al.
2010/0235410 A1  9/2010  Apacible et al.
2011/0126296 A1 * 5/2011  Moore ............................ 726/28
2012/0011271 A1 * 1/2012  Zhao et al. .................... 709/234
2012/0144097 A1 * 6/2012  Hashimoto ................... 711/103

FOREIGN PATENT DOCUMENTS

| CN | 102158323 | | 8/2011 |
|---|---|---|---|
| EP | 1289225 | A2 | 3/2003 |
| EP | 1633077 | A2 | 3/2006 |
| EP | 1821449 | A1 | 8/2007 |

(Continued)

OTHER PUBLICATIONS

Spring, N.T., et al., "A Protocol-Independent Technique for Eliminating Redundant Network Traffic," ACM 1-58113-224-7, 2000, 9 pages.

(Continued)

*Primary Examiner* — David R Lazaro
*Assistant Examiner* — MarieGeorges A Henry
(74) *Attorney, Agent, or Firm* — Slater Matsil, LLP

(57) ABSTRACT

Various methods and communications devices to reduce a bandwidth utilization of a backhaul link in a wireless communications system are provided. By way of example, bandwidth utilization is reduced by relegating the compression of data to the downlink transmission, storing only reference keys in the cache of the transmitting device, and taking advantage of an asymmetrical cache structure between communicating devices. Support is provided for a user equipment to move from one node to another node.

19 Claims, 3 Drawing Sheets

(56) References Cited

FOREIGN PATENT DOCUMENTS

WO      2010145699 A1    12/2010

OTHER PUBLICATIONS

Muthitacharoen, A., et al., "A Low-bandwidth Network File System," DARPA and Space and Naval Warfare Systems Center, San Diego, N66001-00-1-8927, 14 pages.
Notification of Transmittal of the International Search Report and the Written Opinion of the International Searching Authority, or the Declaration, including the full Written Opinion and International Search Report, issued in corresponding International Application No. PCT/CN2013/071700, Huawei Technologies Co., Ltd., dated May 23, 2013, 11 pages.
Extended European Search Report received in Application No. 13752017.7-1853, dated Nov. 5, 2014, 7 pages.

* cited by examiner

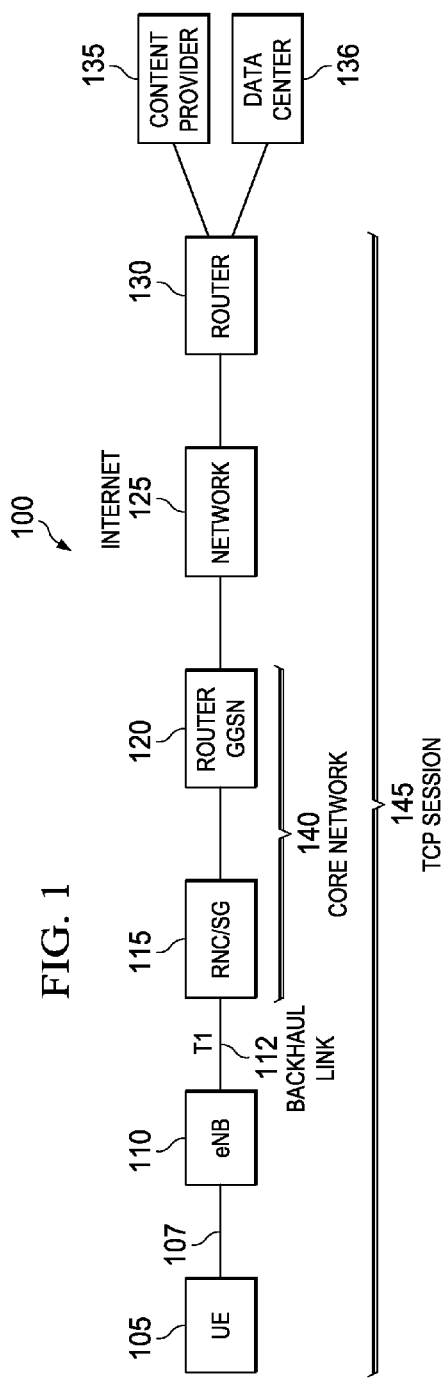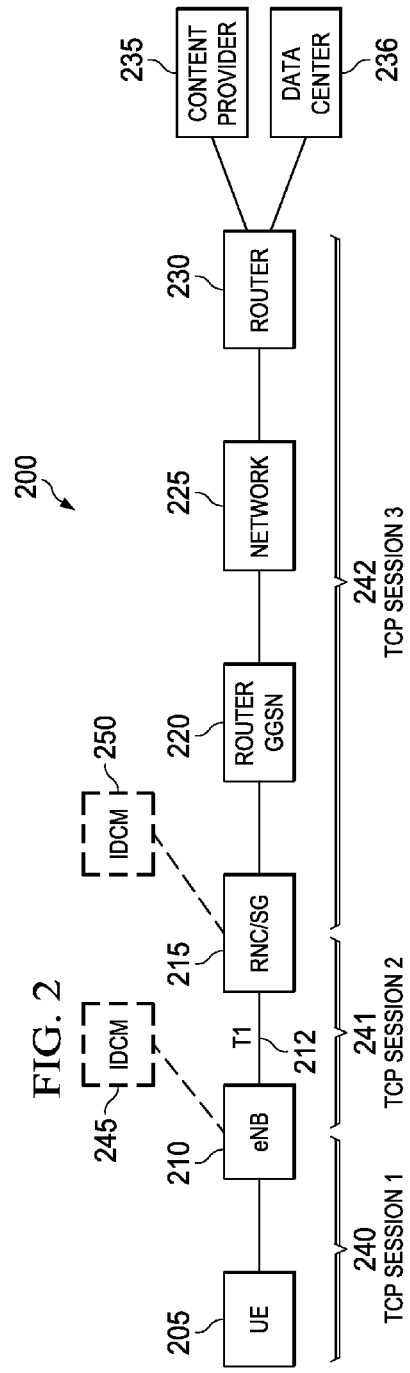

SYSTEM AND METHOD FOR CONTENT AND APPLICATION ACCELERATION IN A WIRELESS COMMUNICATIONS SYSTEM

TECHNICAL FIELD

The present disclosure relates generally to a system and method for digital communications, and more particularly to a system and method for content and application acceleration in a wireless communications system.

BACKGROUND

As mobile communications devices, also commonly referred to as User Equipment (UE), mobile stations, terminals, and so forth, become more technologically advanced, they have become capable of providing more than just voice connectivity. In addition to providing voice connections, the technologically advanced mobile communications devices may enable users to web surf, stream multimedia, share images, serve as access points for computers, and so forth, at continually increasing data rates.

Studies have shown that the world-wide market penetration of advanced mobile communications devices will double in the next few years, increasing from approximately 16 percent of the total mobile communications devices market to about 37 percent of the total mobile communications devices market. Furthermore, data (e.g., web-data, multimedia, images, computer data, and so on) may double each year, every year, for the immediate future.

As an example, mobile Internet has become a common platform to allow users to share information and content using advanced mobile communications devices. Streaming video applications, based on hyper-text transfer protocol (HTTP)/transmission control protocol (TCP), are becoming a dominant traffic pattern in mobile Internet. However, these applications may consume a considerable amount of bandwidth.

Therefore, deployment of such large numbers of the advanced mobile communications devices may place a huge burden on bandwidth capabilities of wireless communications systems, which must continue to increase bandwidth capabilities to ensure adequate performance to satisfy user demands.

SUMMARY OF THE DISCLOSURE

Technical advantages are generally achieved by embodiments of the present disclosure which provide a system and method for content and application acceleration in a wireless communications system.

In an embodiment, a method for transmitting data is provided to significantly reduce the amount of data traffic over the backhaul. In the method, a block of data is received from a content provider and a reference key is generated based on that block of data. Thereafter, a determination is made regarding whether the reference key exists in a cache storing previously saved reference keys. If the reference key exists in the cache, the reference key is transmitted over a backhaul link. If the reference key does not exist in the cache, a new reference key corresponding to the block of data is generated and saved to the cache. Thereafter, the new reference key and the block of data are transmitted over the backhaul link.

In an embodiment, a method for processing data is provided. A determination is made regarding whether only a reference key is received. If only the reference key is received, a cache is searched to retrieve a previously saved block of data corresponding to the reference key. Thereafter, the previously saved block of data is transmitted to a user equipment. If the reference key and a new block of data are received, the reference key and the new block of data are both saved in the cache. Thereafter, the new block of data is transmitted to the user equipment.

From the perspective of the sender side, in an embodiment a communications device is provided. The communications device generally includes a receiver configured to receive content from a content provider, a transmitter configured to transmit blocks of data to another communications device, and a controller operably coupled to the transmitter and to the receiver, the controller configured to control transmissions to and from other communications devices. The communications device also includes a content acceleration unit operably coupled to the controller, to the transmitter, and to the receiver. The content acceleration unit is configured to divide the content into the blocks of data, to generate a reference key corresponding to each of the blocks of data, and to store only the reference keys in a cache of the content acceleration unit on sending side in order to reduce a bandwidth utilization of a backhaul link in a wireless communications system.

From the perspective of the receiver side, in an embodiment a communications device is provided. The communications device includes a receiver configured to receive content from another communications device, a transmitter configured to transmit blocks of data to user equipment, and a controller operably coupled to the transmitter and to the receiver, the controller configured to control transmissions to and from other communications devices. The communications device also includes a content acceleration unit operably coupled to the controller, to the transmitter, and to the receiver. The content acceleration unit is configured to use matching reference keys to retrieve previously stored blocks of data from a cache of the content acceleration unit, to store new reference keys corresponding to new blocks of data in the cache, and to store the new blocks of data in the cache to reduce a bandwidth utilization of a backhaul link in a wireless communications system.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 1 is a simplified schematic of a wireless communications system;

FIG. 2 is a simplified schematic of an embodiment of a wireless communications system employing intelligent data compression method (IDCM) modules to reduce bandwidth utilization of a backhaul link;

DETAILED DESCRIPTION OF ILLUSTRATIVE EMBODIMENTS

Figure 3A:
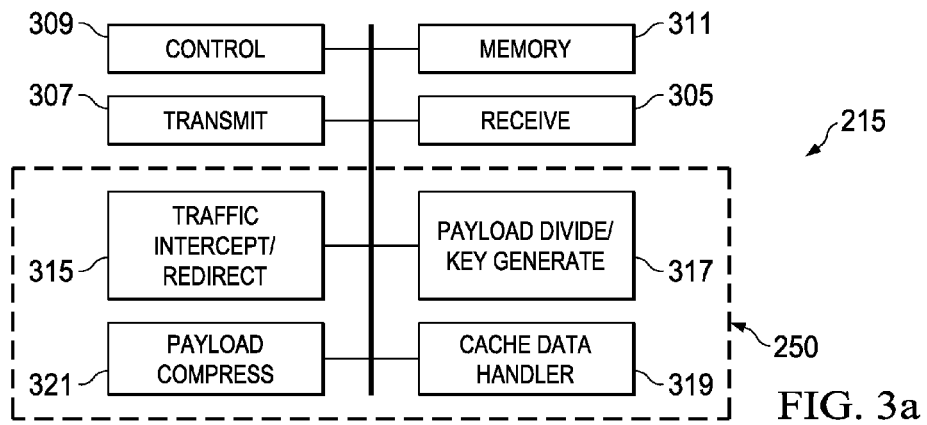
FIG. 3a is a simplified schematic of an embodiment of a content aware device (CAD) (e.g., a radio network controller (RNC), a serving gateway (SGW), etc.) operating in conjunction with one of the IDCM modules in the wireless communications system of FIG. 2.

The making and using of the present embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to a specific context, namely a wireless communications system that supports communications devices with data capability, i.e., third-generation (3G) and fourth-generation (4G) communications devices. The concepts of the present disclosure may also be applied, however, to wireless communications systems that support data capable communications devices in general.

FIG. 1 illustrates a high-level view of a wireless communications system 100. Wireless communications system 100 includes a UE 105 (i.e., a communications device, which may or may not be data capable). UE 105 may be served wirelessly (by link 107) by an enhanced Node B (eNB) 110. eNB 110 may also be referred to as a base station, a controller, a communications controller, and so forth. eNB 110 may control communications to and from UE 105. As such, eNB 110 controls the network access of UE 105. eNB 110 may serve a number of UEs, depending on a configuration of wireless communications system 100, time of day, and so forth.

eNB 110 may be connected (by link 112) to a content aware device (CAD) 115, such as a radio network controller (RNC) for 3G applications or a signaling gateway (SG or SG-Gateway) for 4G applications. Additional examples of a CAD 115 may be a Long Term Evolution (LTE) service architecture evolution (SAE) gateway, a packet gateway, a content access router, or an IP router. Link 112 may be commonly referred to as a backhaul link. Typically, the connection between eNB 110 and CAD 115 may be a wireline connection, for example, a low-bandwidth connection (e.g., a T1 or E1 link) or a high-bandwidth connection (e.g., point-to-point fiber or microwave link). While high-bandwidth connections are available, due to economic reasons (e.g., deployment costs), low-bandwidth connections still dominate.

CAD 115 may be connected to a first router 120, which in turn, may be connected to a network 125. The first router 120 may incorporate or utilize a gateway GPRS support node (GGSN). Network 125 may be the Internet, a private network, or a combination thereof. Network 125 may be connected to a second router 130, which may be connected to a content provider 135, a data center 136, or so forth. RNC 115 and first router 120 may make up a core network 140. Interconnectivity between components of core network 140 and between core network and content provider 135/data center 136 are generally made up of high-bandwidth wireline connections and typically do not present a limitation to the performance of wireless communications system 100.

A connection between UE 105 and either content provider 135 or data center 136 may be a single TCP session 145, wherein a TCP packet may be transported from content provider 135 or data center 136 to UE 105 or vice versa. Although the TCP packet may take multiple hops between content provider 135 or data center 136 to UE 105, the TCP packet traverses single TCP session 145.

Because a wireless connection (e.g., link 107) is generally not capable of supporting as much bandwidth as a wireline connection, it is a major bottleneck in wireless communication system 100. However, this disclosure is not focused on trying to solve this particular bottleneck. Rather, this disclosure focuses on the connection between device 110 to content provider 135 or data center 136.

Although a backhaul link (e.g., link 112) may be a wireline connection with a considerably higher bandwidth than a wireless link (e.g., link 107), eNB 110 may serve a large number of UEs, with each UE having one or more active connections to core network 140. As an example, if link 112 is a 1 Mbps link and eNB 110 is serving 20 different UEs, each demanding maximum bandwidth, then each UE may only be allocated a maximum bandwidth of 50 kbps. Such an allocation may or may not be adequate for the applications executing on the UEs. Therefore, an aggregate bandwidth from each UE being served by eNB 110 may exceed the bandwidth of the backhaul link, thereby making the backhaul link significant bottleneck of wireless communications system 100.

Even as providers are planning to replace low-bandwidth backhaul links with high-bandwidth backhaul links, a coverage area of an eNB is becoming smaller. Indeed, it is predicted that micro or pico eNBs will become significant players in next generation wireless communications systems. Smaller coverage areas imply an increased number of eNBs in order to provide a similar degree of coverage, and increasing the number of eNBs also increases the number of backhaul links. Therefore, to reduce deployment costs, providers may continue to use low-bandwidth backhaul links.

FIG. 2 illustrates wireless communications system 200, wherein wireless communications system 200 includes enhancements for reducing bandwidth utilization of a backhaul link. As shown in FIG. 2, a connection between UE 205 and either a content provider 235 or data center 236 may occur through connections over an eNB 210, a CAD 215, a first router 220, a network 225, and a second router 230. As shown, the connections generally comprise three TCP sessions (TCP session 1 240, TCP session 2 241, and TCP session 3 242 rather than a single TCP session (such as TCP session 145 shown in FIG. 1)). TCP session 1 240 may be between UE 205 and eNB 210, TCP session 2 241 may be between eNB 210 and CAD 215, and TCP session 3 242 may be between CAD 215 and second router 230.

According to an embodiment, intelligent data compression method (IDCM) modules 245 and 250, which may also be referred to as IDCM units, may be added to both ends of link 212 (i.e., the backhaul link) to reduce backhaul link bandwidth utilization. As shown in FIG. 2, eNB 210 is at a first end of the backhaul link and CAD 215 is at a second end of the backhaul link. Although shown in FIG. 2 to be attached to eNB 210 and CAD 215, IDCM modules 245 and 250 may be implemented as integral part of eNB 210 and CAD 215. For example, IDCM modules 245 and 250 may be implemented as software, hardware, firmware, or a combination thereof in eNB 210 and CAD 215.

According to an alternative embodiment, IDCM modules 245 and 250 may be standalone hardware positioned on the backhaul link between eNB 210 and CAD 215. According to yet another alternative embodiment, IDCM modules 245 and 250 may be implemented differently. As an example, IDCM module 245 may be implemented as software, hardware, or firmware in eNB 210, while IDCM module 250 may be implemented as a standalone hardware positioned on the backhaul link between eNB 210 and CAD 215.

According to yet another alternative embodiment, IDCM modules 245 and 250 may partially implemented as software, hardware, or firmware in eNB 210 and CAD 215 and partially as standalone hardware positioned on the backhaul link between eNB 210 and CAD 215. IDCM modules 245 and 250 may be implemented purely in software, an add-on service card, a standalone hardware device, or a combination thereof.

As will be more fully explained below, the use of IDCM modules 245 and 250 can significantly increase the capacity of backhaul links. Therefore, the IDCM modules 245 and 250 can help solve the bandwidth bottleneck at the backhaul link. A detailed discussion of the IDCM modules 245 and 250 and their operation is provided below.

Figure 3B:
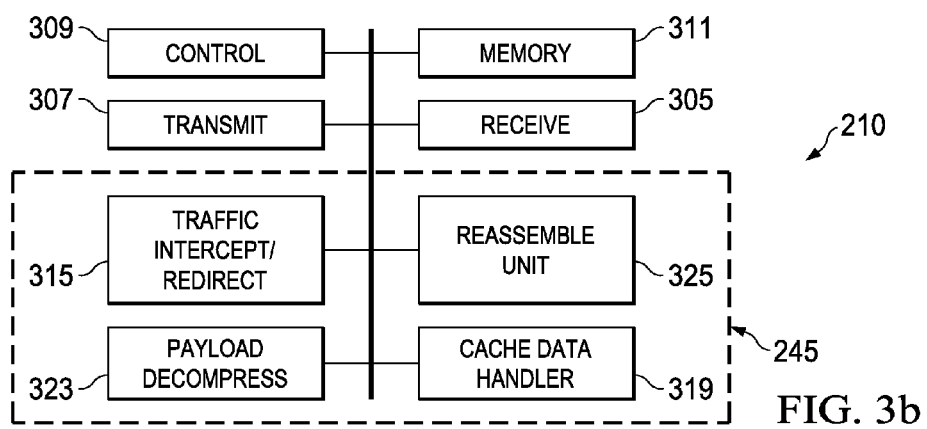
FIG. 3b is a simplified schematic of an embodiment of a base station (e.g., a node B, an evolved node B, a controller, a communications controller, etc.) operating in conjunction with another of the IDCM modules in the wireless communications system of FIG. 2.

Referring collectively to FIGS. 3a and 3b, CAD 215, which operates in conjunction with IDCM module 250, and eNB 210, which operates in conjunction with IDCM module 245, are each illustrated in further detail. As shown, CAD 215 and eNB 210 each includes a receive unit 305 that may be used to receive incoming information, which is generally in the form of TCP packets. CAD 215 and eNB 210 may also include a transmit unit 307 that may be used to transmit outgoing information. Receive unit 305 and transmit unit 307 may be wireline and/or wireless units. In general, TCP packets may arrive at CAD 215 and eNB 210 through receive unit 305 and may leave CAD 215 and eNB 210 through transmit unit 307.

CAD 215 and eNB 210 also include a control unit 309. Control unit 309 may be implemented using a general purpose or special purpose processor or controller, combinatorial logic, state machines, or a combination thereof. Control unit 309 may be used to control the operation of CAD 215 and eNB 210. For example, control unit 309 in CAD 215 of FIG. 3a may be used to compute routes based on a routing function, detect faults, serve as anchors for UEs, and so on. Control unit 309 in eNB 210 of FIG. 3a may be used to grant and schedule transmission opportunities to UEs served by control unit 309, process attach requests, participate in handovers, and so forth.

Referring collectively to FIGS. 3a-3b, CAD 215 and eNB 210 also include a memory 311 that may be used to store configuration information, routing information, UE specific information, scratch memory, buffer space for transmissions, and so forth. Memory 311 may be a combination of read-only memory, random access memory, programmable read-only memory, and so on.

As shown in FIG. 3a, CAD 215 includes or accesses the IDCM module 250 and, as shown in FIG. 3b, eNB 210 includes or accesses the IDCM module 245 for content acceleration. As shown in FIGS. 3a-3b, IDCM module 250 and 245 may be implemented as a number of discrete units where each discrete unit is used for specific IDCM operations. IDCM module 250 and 245 may be implemented as a single unit that may be used for a combination of specific IDCM operations. Therefore, while the discussion focuses on a number of discrete units, IDCM module 250 and 245 may be implemented as a single unit or a number of units with some units being used for several specific IDCM operations.

According to an embodiment, IDCM module 250 of CAD 215 includes a traffic intercept/re-direct unit 315, a payload divide/key generate unit 317, a cache data handler unit 319, and a payload compress unit 321 as shown in FIG. 3a.

Traffic intercept/re-direct unit 315 may be used to intercept and re-direct all or selected TCP traffic to other units in IDCM module 250. The traffic intercept/re-direct unit 315 may reside in the IDCM module 250 or be external to CAD 215 as a separate standalone unit. Examples of protocols used to re-direct the TCP traffic may include web cache communications protocol (e.g., WCCP 2.0), a proprietary proxy re-direction protocol, an internal application programming interface (API), and so forth.

In an embodiment, once traffic intercept/re-direct unit 315 receives TCP traffic, it may break the TCP session into three TCP sessions. The breaking of the TCP session into three TCP sessions may involve traffic intercept/re-direct unit 315 forming a first TCP session. Traffic intercept/re-direct unit 315 may then create a second TCP session between itself and its remote peer (e.g., an alternate traffic intercept/re-direct unit 315 located at the CAD if traffic intercept/re-direct unit 315 is located at an eNB or an alternate traffic intercept/re-direct unit 315 at the eNB if traffic intercept/re-direct unit 315 is located at a CAD). The remote peer of traffic intercept/re-direct unit 315 may then create a third TCP session connecting itself to the original TCP destination address.

In general, a TCP session between a UE and a server that is intercepted by IDCM module 250 may be broken down into three TCP sessions, with one TCP session between the UE and an IDCM module located at an eNB serving the UE, another TCP session between the IDCM module located at the eNB and an IDCM module located at a CAD, and another TCP session between IDCM module located at the CAD and the server.

Once traffic intercept/re-direct unit 315 of IDCM module 250 gets the re-directed TCP session broken down into three separate TCP sessions, payload divide/key generate unit 317 may examine a data payload carried in the TCP session 242 and divide (break-up) the data payload into smaller blocks. An algorithm used to divide the data payload may divide the data payload into fixed sized blocks. Alternatively, the algorithm may divide the data payload into variable sized blocks based on specified binary patterns. A maximum size may be specified for the blocks.

Payload divide/key generate unit 317 performs at least two functions. First, the payload divide/key generate unit 317 divides the data received from content provider 235 and/or data center 236 into blocks. In an embodiment, the division of data into blocks is based on a special data pattern such as, for example, a pattern obtained from a fingerprinting algorithm.

After the data has been divided into blocks, the payload divide/key generate unit 317 generates a distinct reference key for each block. The reference keys representing the blocks of data, but not the blocks of data, are saved in the cache of IDCM module 250. As will be more fully explained below, the reference keys may be used for cache look-up, reduction of backhaul link bandwidth utilization, and so forth.

Cache data handler unit 319 of IDCM module 250 may be used to maintain a cache. The cache may be stored in a memory local to IDCM module 250 or it may be formed out of memory 311. The cache may be relatively large in size.

Because extremely fast memory may not be needed, the cache may be formed out of secondary memory, such as magnetic disk storage memory. Therefore, extremely high-speed memory used in a normal cache may not be needed.

Cache data handler unit 319 of IDCM module 250 may be used to perform reference key queries to the cache. A reference key table may be preserved in a memory (again, local to the IDCM module 250 or part of memory 311) that contains the reference keys only. When a new reference key is generated, cache data handler unit 319 searches the cache for a matching reference key. If a matching reference key is found, the reference key is sent to the eNB 210. In contrast, if no matching reference key is found in the cache, the newly generated reference key is inserted into the reference key table. Thereafter, the newly generated reference key and the block of data associated therewith are both sent to the eNB 210. Cache data handler unit 319 does not request that the blocks of data associated with the reference key be stored in the cache of IDCM module 250.

If the reference key table is full and the reference key is not already in the reference key table, then cache data handler unit 319 may need to replace an existing reference key in the reference key table to make room to store the reference key. According to an embodiment, any of a wide range of replacement algorithms, such as first in first out, reference key age, reference key use (recent usage), or so on, may be used to select a reference key to be replaced.

Payload compress unit 321 of IDCM module 250 may be used to compress blocks of data that have reference keys not already in the reference key table. As discussed previously, if a block of data has a reference key that is not in the reference key table, the block of data (and its reference key) will be transported to the peer IDCM module (e.g., IDCM module 245 of eNB 210). However, instead of transporting the block of data in uncompressed form, the block of data may be compressed prior to transmission. Depending on the type of data in the block of data and a compression algorithm being used, compressing the block of data prior to transmission may reduce the amount of data being transmitted by a significant percentage, up to 90 percent in some cases.

With all of the blocks of data from the TCP session compressed, IDCM module 250 may send the reference key and any compressed blocks of data to its peer unit, namely IDCM module 245 of eNB 210. As will be more fully explained below, IDCM module 245 may use the reference keys and the compressed blocks of data to reconstruct the blocks of data of the TCP session. The IDCM module 245 of eNB 210 may then send the blocks of data of the TCP session to an intended destination of the TCP session.

According to an embodiment, IDCM module 245 of eNB 210 includes a traffic intercept/re-direct unit 315, a cache data handler unit 319, and a payload decompression unit 323, and a reconstruction unit 325 as shown in FIG. 3b.

In some circumstances, the traffic intercept/re-direct unit 315 of IDCM module 245 operates similarly to that of IDCM module 250. Indeed, traffic intercept/re-direct unit 315 of IDCM module 245 is used to intercept and re-direct all or selected TCP traffic to other units in IDCM module 245.

The cache data handler unit 319 of IDCM module 245 performs different operations depending on what is received from IDCM module 250. If, for example, IDCM module 250 sends only reference keys, cache data handler unit 319 of IDCM module 245 searches its own cache to find the blocks of data that correspond to the received reference keys. As will be more fully explained below, the blocks of data are then re-assembled and sent on to, for example, UE 205. In an optimal condition, cache data handler unit 319 of IDCM 250 will find all of the reference keys associated with the blocks of data for the TCP session already located in the reference key table.

If, however, IDCM module 250 sends both reference keys and blocks of data, the IDCM module 245 knows that some of the reference keys, namely those corresponding to the blocks of data that were just received, are new and not found in its cache. Therefore, cache data handler unit 319 of IDCM module 245 saves both the new reference keys and the corresponding received blocks of data in its cache. IDCM module 245 also searches its cache to find and retrieve blocks of data that correspond to the other received reference keys (i.e., those reference keys that were received from IDCM module 250 without corresponding blocks of data). The received blocks of data and retrieved blocks of data are then re-assembled and sent on to UE 205.

Because IDCM module 250 only stores reference keys in its cache and IDCM module 245 stores both reference keys and blocks of data in its cache, the cache of IDCM module 250 and the cache of IDCM module 245 are asymmetrical. The structure of these caches is designed for uni-directional de-duplication because traffic on the backhaul link is typically not symmetrical. Indeed, the data in a downlink is not typically seen in an uplink. Even so, the reference keys stored in the cache of IDCM module 250 are complimentary to the reference keys stored in the cache of IDCM module 245.

Still referring to FIG. 3b, IDCM module 245 of eNB 210 may also include payload decompress unit 323. Payload decompress unit 323 may be used to decompress the compressed data received from the IDCM module 250 of CAD 215 as described herein. IDCM module 245 of eNB 210 may also include reconstruction unit 325. Reconstruction unit 325 is employed to reassemble the blocks of data, as discussed above.

In an embodiment, IDCM 250 may aggregate a group of blocks to form a hyper block, which can be used to further improve the compression ratio. When used, the hyper block is assigned a hyper block reference key similar to the manner in which a block is assigned a reference key. However, the hyper block and its reference key are treated someone differently when implemented in the communication system 200 by the IDCM modules 250 and 245. The hyper block exploits the locality of blocks. Where a sequence of blocks is likely to be repeated in data stream, a hyper block can be formed from the sequence of blocks. When the sequence of blocks is repeated, that sequence can be encoded as a pointer to an earlier occurrence. The pointer (i.e., a hyper block reference key) may be transmitted along with the number of blocks in the sequence to be matched.

Figure 4:
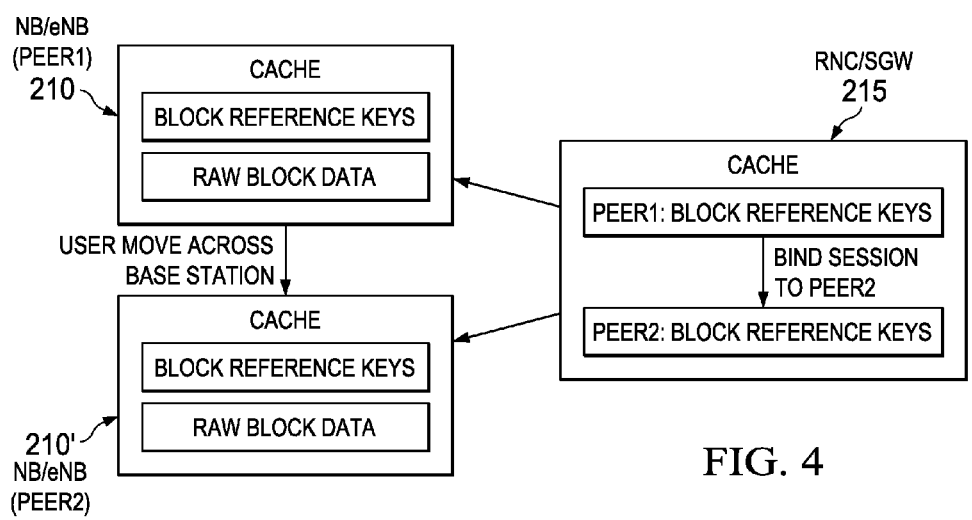
FIG. 4 is a simplified schematic illustrating an embodiment of a method of transitioning a user equipment (UE) from one eNB to another eNB while using the system of FIG. 2.

Referring now to FIG. 4, a simplified schematic illustrates how the CAD 215 handles operations when the UE 205 of FIG. 2 moves from one eNB 210 to another peer, which is designated eNB 210'. In an embodiment, when UE 205 moves from eNB 210 to eNB 210', the IDCM module 250 of CAD 215 piggy backs the traditional wireless channel to send session information with the original user profile. In other words, the IDCM module 250 of CAD 215 discontinues extracting information from within the cache of IDCM module associated with eNB 210 and begins extracting information from the cache of IDCM module associated with eNB 210'.

Figure 5:
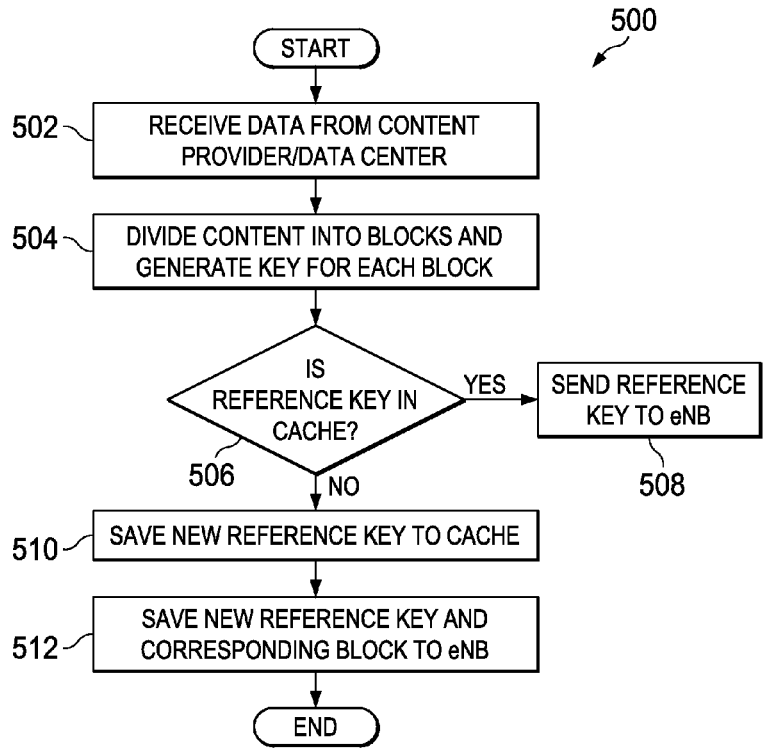
FIG. 5 is a flowchart illustrating an embodiment of a method of improving backhaul link bandwidth utilization using the system of FIG. 2.
Figure 6:
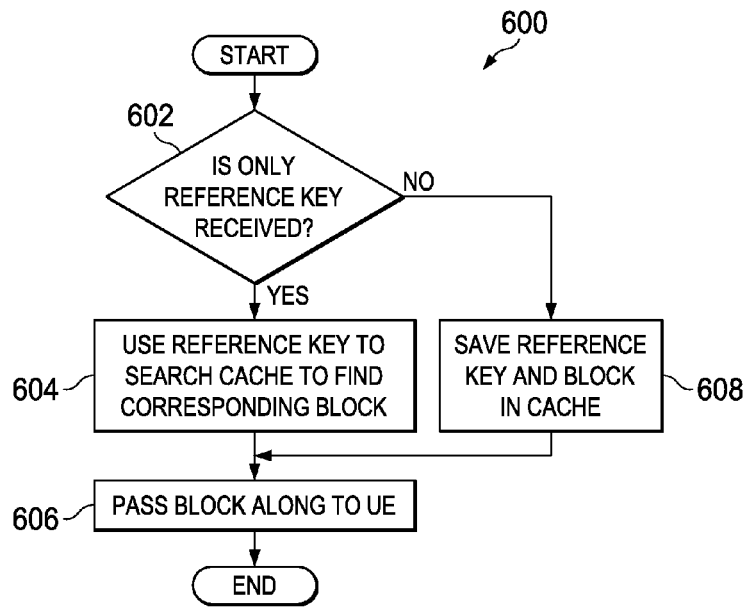
FIG. 6 is a flowchart illustrating an embodiment of another method of improving backhaul link bandwidth utilization using the system of FIG. 2.

FIGS. 5 and 6 illustrate flow diagrams of IDCM module operations 500, 600 in improving backhaul link bandwidth utilization. IDCM module operations 500, 600 may be indicative of operations occurring in IDCM modules 250 and 245 as these components perform caching, using reference keys and/or hyper reference keys, to improve backhaul link bandwidth utilization at a content end of a TCP session.

Referring now to FIG. 5, at block 502, CAD 215 receives data (e.g., a video file) from content provider 235 or data center 236. In block 504, the IDCM module 250 of CAD 215 divides the content into blocks and generates a distinct key for each of those blocks. In an embodiment, the IDCM module 250 also divides the content into hyper blocks and generates hyper keys for each of those blocks. At block 506, the cache data handler 319 in the IDCM module 250 searches its cache to determine if each of the reference keys is in the cache. For those reference keys that are found in the cache, the IDCM module 250 sends the reference keys to the eNB 210 in block 508. For those reference keys not found in the cache, the IDCM module 250 saves the new reference keys in its cache in block 510. In block 512, the IDCM module 250 of CAD 215 sends the new reference keys and the corresponding blocks to the eNB 210. In an embodiment, the IDCM module 250 of CAD 215 sends all the reference keys, including those found in its cache and those that were newly created, simultaneously.

Referring now to FIG. 6, at block 602, IDCM module 245 of eNB 210 determines if only reference keys were received. If so, at block 604 the cache data handler 319 in the IDCM module 245 uses the reference keys to search its cache to find and retrieve corresponding blocks of data. Then, in block 606, IDCM module 245 of eNB 210 passes the retrieved blocks of data along to UE 205.

If reference keys and blocks of data were received by the IDCM module 245, cache data handler 319 in the IDCM module 245 saves the reference keys and corresponding blocks of data to its cache in block 608. Then, in block 606, IDCM module 245 of eNB 210 passes the received blocks of data along to UE 205. In an embodiment, the received blocks of data and retrieved blocks of data are simultaneously sent to the UE 205 by the IDCM module 245.

From the foregoing, those skilled in the art will appreciate the benefits provided by using IDCM modules 250 and 245 in the communication system 200. For example, IDCM modules 250 and 245 eliminate or mitigate some of the problems of using a traditional cache, namely that the traditional cache is deployed at only one end of the backhaul link and cannot deal with dynamic (active) web content. In addition, the use of IDCM 250 and 245 offers an asymmetrical cache and permits a user to easily move between eNBs, which a conventional WOC (wide area network (WAN) optimization controller) does not because backhaul connections are bound with fixed peers. Moreover, the use of IDCM 250 and 245 and the asymmetric cache structure permits data to be compressed from a single side (e.g., at the IDCM module 250), which ensures that the resources of base station (e.g., eNB 210) need not receive a costly upgrade.

In addition to the above, use of IDCM 250 and 245 may be, in an embodiment, implemented by adding a service card to CAD 215 and by providing a software upgrade to eNB 210. Use of IDCM 250 and 245 also, in an embodiment, permits leveraging the resource rich CAD 215 in order to process data compression, which consequently solves the resource constraint on eNB 210 because data decompression is generally not as taxing on, for example, a central processing unit (CPU) or memory as compression. Further, use of IDCM 250 and 245 and the asymmetrical cache provide for efficient cache utilization, which improves scalability and performance.

Although embodiments described hereinabove operate within the specifications of a cellular communication network such as a 3GPP-LTE cellular network, other wireless communication arrangements are contemplated within the broad scope of an embodiment, including WiMAX, GSM, Wi-Fi, and other wireless communication systems.

It is noted that, unless indicated otherwise, functions described herein can be performed in either hardware or software, or some combination thereof, with or without human intervention. In an embodiment, the functions are performed by a processor such as a computer or an electronic data processor in accordance with code such as computer program code, software, and/or integrated circuits that are coded to perform such functions, unless indicated otherwise.

While the disclosure has been made with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for transmitting data, comprising:
   receiving a block of data, by a radio network controller (RNC) or serving gateway (SGW) from a content provider;
   generating, by the RNC or SGW, a reference key from the block of data;
   determining if the reference key exists in a cache storing previously saved reference keys; and
   in response to the reference key not existing in the cache:
   generating, by the RNC or SGW, a new reference key corresponding to the block of data,
   saving, by the RNC or SGW, the new reference key to the cache without saving the block of data to the cache, and
   transmitting, by the RNC or SGW, the new reference key and the block of data over a backhaul link;
   receiving a second block of data, by the RNC or SGW from the content provider;
   generating, by the RNC or SGW, a second reference key from the second block of data; and
   in response to the second reference key existing in the cache, transmitting, by the RNC or SGW, the second reference key over the backhaul link.

2. The method of claim 1, further comprising aggregating blocks into hyper blocks.

3. The method of claim 2, further comprising assigning a hyper reference key to each of the hyper blocks.

4. The method of claim 3, further comprising transmitting the hyper reference key along with matched blocks information.

5. The method of claim 1, further comprising compressing the block of data prior to transmitting the block of data over the backhaul link.

6. The method of claim 1, further comprising binding a session in the cache from a first peer over to a second peer in response to a user migrating from a first base station to a second base station.

7. The method of claim 1, further comprising transmitting the reference key over the backhaul link to a communication device having an asymmetrical cache relative to the cache.

8. The method of claim 1, further comprising transmitting the new reference key and the block of data over the backhaul link to a communication device having an asymmetrical cache relative to the cache.

9. A radio network controller (RNC) or serving gateway (SGW), comprising:
- a receiver configured to receive content from a content provider;
- a transmitter configured to transmit blocks of data to another communications device;
- a non-transitory memory comprising code, and
- a hardware processor operably coupled to the transmitter, the receiver and the memory, wherein the hardware processor executes the code to:
  - control transmissions to and from other communications devices,
  - divide the content into the blocks of data,
  - generate a reference key corresponding to each of the blocks of data, and
  - for each reference key:
    - determine if the reference key exists in a cache storing previously saved reference keys,
    - when the reference key does not exist in the cache, store only the reference key in the cache, without storing the corresponding block of data in the cache; and
    - when the reference key does not exist in the cache, cause the transmitter to transmit the corresponding block of data to the another communication device.

10. The RNC or SGW of claim 9, wherein the hardware processor further executes the code to compress the blocks of data.

11. The RNC or SGW of claim 9, the transmitter further configured to transmit the reference keys to the another communication device.

12. A radio network controller (RNC) or serving gateway (SGW), comprising:
- a receiver configured to receive a block of data from a content provider;
- a transmitter configured to communicate with another communications device;
- a non-transitory memory comprising code; and
- a hardware processor operably coupled to the transmitter, the receiver and the memory, wherein the hardware processor executes the code to:
  - generate a reference key from the block of data;
  - determine if the reference key exists in a cache storing previously saved reference keys;
  - when the reference key exists in the cache, cause the transmitter to transmit the reference key over a backhaul link; and
  - when the reference key does not exist in the cache:
    - generate a new reference key corresponding to the block of data,
    - save the new reference key to the cache without saving the block of data to the cache, and
    - cause the transmitter to transmit the new reference key and the block of data over the backhaul link.

13. The RNC or SGW of claim 12, wherein the hardware processor further executes the code to aggregate blocks into hyper blocks.

14. The RNC or SGW of claim 13, wherein the hardware processor further executes the code to assign a hyper reference key to each of the hyper blocks.

15. The RNC or SGW of claim 14, wherein the hardware processor further executes the code to cause the transmitter to transmit the hyper reference key along with matched blocks information.

16. The RNC or SGW of claim 12, wherein the hardware processor further executes the code to compress the block of data prior to causing the transmitter to transmit the block of data over the backhaul link.

17. The RNC or SGW of claim 12, wherein the hardware processor further executes the code to bind a session in the cache from a first peer over to a second peer when a user migrates from a first base station to a second base station.

18. The RNC or SGW of claim 12, wherein, when the reference key exists in the cache, the hardware processor further executes the code to cause the transmitter to transmit the reference key over the backhaul link to the another communications device having an asymmetrical cache relative to the cache.

19. The RNC or SGW of claim 12, wherein, when the reference key does not exist in the cache, the hardware processor further executes the code to cause the transmitter to transmit the new reference key and the block of data over the backhaul link to the another communications device having an asymmetrical cache relative to the cache.

* * * * *